Jan. 10, 1961  C. W. FORESTEK  2,967,805
RESILIENT SEALING MEANS AND METHOD OF MAKING SAME
Filed Aug. 22, 1957

INVENTOR.
CLARENCE W. FORESTEK
BY
J. William Freeman
ATTORNEY

United States Patent Office 2,967,805
Patented Jan. 10, 1961

2,967,805

RESILIENT SEALING MEANS AND METHOD OF MAKING SAME

Clarence W. Forestek, 4210 W. 62nd St., Cleveland, Ohio

Filed Aug. 22, 1957, Ser. No. 679,559

6 Claims. (Cl. 204—20)

This invention relates to the art of resilient sealing members in general, and in particular relates to resilient O-rings subjected to abnormal temperature and pressure conditions.

In the art of O-ring construction, it has long been known that the inherent resiliency of these members permits the use of the same to effectively seal an opening between adjacent parts, in view of the fact that the same can be compressed within the space to form a sealing barrier. Thus, in the case of sealing a shaft, for example, with respect to a relatively rotatable surrounding housing, it has been common practice to provide an O-ring in the space between the shaft and the housing to effectuate an efficient seal in this area. Similarly, the flat or disc type of washer normally used in valve members, utilizes the inherent resiliency of the washer to effectuate the sealing action.

While the above preferably described types of resilient seals operate satisfactorily under normal conditions, it has been found that the efficiency and life thereof are unfavorably affected when the same are subjected to certain adverse types of conditions that frequently occur in industrial use. Thus, for example, where the rubber sealing member is subjected to a high temperature, it has been found that the major constituents thereof will decompose to a fluid state, or chemically break down to release volatiles, thereby rendering the sealing unit useless. Similarly, if the resilient sealing member is subjected to a corrosive action, the body portion thereof will be eroded or corroded to a point where the same will not be able to effectuate a satisfactory sealing. Other extreme conditions that result in premature deterioration of the sealing means or inefficiency thereof, include pressure extremes either high or low, and subjection to certain compounds and gases that operate to decompose or dissolve the body portion of the resilient sealing member. Similarly, when exposed to low temperatures, the inherent resiliency of these rings is lost due to the embrittlement occurring, with actual fracture frequently occurring.

In the past, the prior art has attempted to obviate the aforementioned difficulty by changing and varying the composition of resilient sealing members so that the same would theoretically be able to withstand such extreme conditions. Thus, for example, if it were contemplated that extreme temperatures would be encountered, the resilient substance would be compounded so as to have a higher point of decomposition. Similar precautionary moves in compounding have been attempted with respect to the use of additives and substitutes that would resist other deteriorating actions that are encountered during normal usage.

While the above preventative measures have, to some degree, increased the efficiency and life of resilient means, the same do not, at the present time, provide a satisfactory solution to the problem, in view of the fact that the temperature, pressure and corrosion factors cannot be fully compensated by such variations in compounding. Thus, with temperatures in the range 100° F. to 700° F. being encountered, it is impossible, at the present time, to compound a resilient material that will withstand this extreme temperature condition.

In co-pending application Serial No. 564,484, filed February 9, 1956, by Clarence W. Forestek, there is described an improved type of resilient sealing means that is characterized by the encasement of the resilient body portion in a metallic sheath with the result that the overall sealing member assumes the inherent characteristics of the resilient core with the outer sheath of metal serving to withstand the various extremes to which the sealing member was subjected while the resilient core provides the requisite flexibility to the overall unit.

While the above-described improved type of resilient sealing member set forth in the above-referred to co-pending application is satisfactory under most conditions, it has been found that failure will occur under the most extreme conditions in view of the difference in expansion rate between the resilient core and the metallic sheath. Thus, in moving from 100° F. to a temperature of 700° or 800° F., the resilient core will expand more rapidly than will the metallic sheath. This difference in expansion rate will accordingly cause, due to the fact that the same is enclosed within the sheath, a bursting pressure to be exerted outwardly against the surrounding sheath, and, accordingly, with this sheath so subjected to pressure the same will burst with the result that the effectiveness of the seal is destroyed.

In co-pending application Serial No. 608,044, filed September 5, 1956, by Clarence W. Forestek, there was disclosed certain methods wherein the above-described problem of bursting was minimized by the provision of means by which the resilient core was permitted to expand interiorly of the surrounding metallic sheath. Specifically, a space was provided between the internal wall of the sheath and the external surface of the resilient core with the result that at the time of use, this space could compensate for the difference in expansion rates of the sheath and core.

One specific method of attaining this desired internal space mentioned in the above-referred to co-pending application, was to specially contour the external surface of the resilient core followed by a preliminary plating of the same. In the subsequent heating step, the core would expand to a full circular shape, causing an equivalent expansion of the surrounding core. Upon cooling, the core would collapse while the surrounding sheath would retain its newly formed shape to thus create a void between the sheath and the core. Other methods suggested in this regard by the above-referred to co-pending application included the provision of apertures in the metallic sheath through which the expanding resilient core could pass during heating so as to be trimmed off prior to contraction thereof. In this manner, upon contraction, a void would occur internally of the sheath due to the fact that a certain portion of the rubber had expanded and been removed.

While the creation of an internal void by the above-described procedures has proved satisfactory to some extent, certain manufacturing difficulties have been encountered that make the above procedure relatively expensive from a cost standpoint. In this regard, it has been found difficult, especially with regard to small diameter O-rings, to provide the requisite grooves thereon, with the machining or molding operation that is required for such a procedure, adding considerably to the overall cost of these relatively low priced, high production, units. Similarly, with regard to the puncturing and removal of a portion of the core during expansion, it was found that the handling cost involved made difficult mass production of the items.

It has been discovered that the aforementioned production cost can be greatly minimized by merely causing an expansion of the resilient core prior to the plating operation, with the expanded core being plated in its expansion condition. Subsequently, upon cooling, the core will shrink to normal size while the surrounding metallic sheath will retain the substantial plated size thereof and in this manner, an internal void will be easily created with a minimum amount of effort. More specifically, it has been found that by pre-treating the resilient core with a volatile material, that an abnormal expansion of the same will occur. Further, if a relatively thin plate coat is applied to the ring in this expanded condition, it has been found that this coating will be porous enough to permit passage therethrough of the evaporating volatile so that upon cooling of the plated core, the resilient internal core portion will contract so as to have portions thereof spaced from the internal surface of the metallic sheath.

It accordingly becomes the principal object of this invention to provide an improved method of plating resilient O-rings characterized by the preliminary expansion of the O-rings and followed by a preliminary application of an electro-deposited material to the core in its expanded condition.

It is a still further object of this invention to provide an improved method of plating O-rings wherein inexpensive and high production methods of void creation are provided for the purpose of compensating for unequal expansion of the resilient and metallic portions of the O-rings.

These and other objects of the invention will become more apparent upon a reading of the following brief specification, considered and interpreted in the light of the accompanying drawings.

Figure 1:
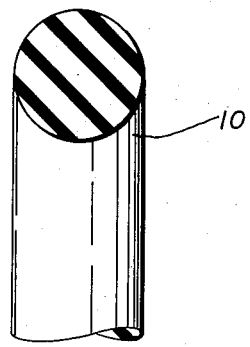
Figure 1 is an enlarged cross-sectional view of the O-ring in its normal condition.
Figure 2:
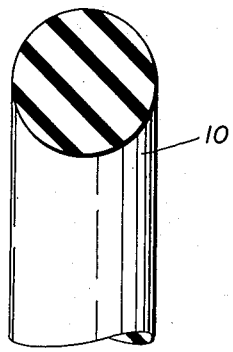
Figure 2 is a cross-sectional view of the same after same has been expanded by treatment with a volatile.
Figure 5:
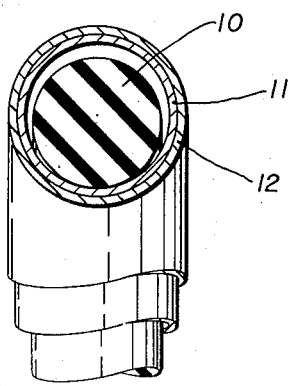
Figure 5 is a similar sectional view showing the application of the final plating coating.

In practice of the invention to the end of attaining an O-ring of the type shown in Figure 5 of the drawings, a customary O-ring 10 of circular cross-section, and being of the type shown in Figure 1, is first expanded to the condition of Figure 2 by boiling same in a chlorinated solvent until the expanded condition of Figure 2 is reached. At this point, and in this expanded condition, the core member 10 is then provided with a thin coat of copper plating, the thickness of which normally falls between .002 and .005 inch in thickness with this size being dependent upon the overall diameter of the ring member being plated. In this regard, the application of such a relatively thin coating permits a certain degree of porosity therein with the result that volatiles can pass therethrough as will presently be described.

Figure 3:
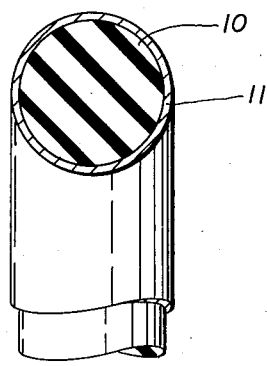
Figure 3 is a similar cross-sectional view showing the application of the thin metallic coating around the O-ring in its expanded condition.
Figure 4:
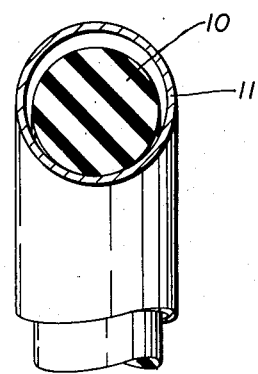
Figure 4 is a similar sectional view showing the component parts after contraction of the core member.

After this preliminary plating and attainment of the condition shown in Figure 3, wherein the expanded core 10 is surrounded by the thin sheath 11, the plated ring is then preferably placed under a vacuum for a period of several hours to effectuate a shrinkage of the core portion 10 the condition of Figure 4.

Following the vacuum treatment just-described, the preferred process envisions the additional step of baking the component parts at a temperature of approximately 120° to 160° F. for a period of several hours, with this optional heating step serving to completely drive off the volatile material through the thin porous coating that has been previously applied.

After the completion of the vacuum and/or heat treating just-described, the parts may then be subjected to a cleaning action whereupon an additional copper or other metallic layer 12 may be applied by utilization of known plating practices. At this point, the component parts are completely finished and ready for usage or suitable for surface polishing.

As a representative example of the manner of practicing the invention as above-described, a series of twelve identical neoprene O-rings each having an external diameter of approximately .900 inch and a stock-thickness, or cross-sectional thickness, of .102 inch were subjected to treatment as follows.

First, the above parts were boiled in ethylenedichloride until the same had expanded in size to a diameter ranging between .941 and .951 inch average O.D., with the stock-thickness of the rings having correspondingly expanded in thickness to a dimension between .110 and .112 inch. It is to be understood that the rings could be subjected to the vapors of ethylenedichloride vapors instead of being immersed therein as described. In this manner the parts could economically be placed in the baskets and subjected to the vapors that are present in conventional degreasing operations.

These expanded rings were then plated in a copper solution of the type set forth in the above referred to co-pending application Serial No. 564,484 and plated as set forth therein until approximately .003 inch of cooper was applied thereon.

At this point, the preliminarily expanded and plated rings were placed under a 29 inch mercury vacuum for a period of thirty-six hours, after which time it was found that the average O.D. of the component parts had been reduced to .927 inch while the average stock-thickness thereof had been reduced to an average of .105 inch. In this regard, certain of the test specimens were cut apart at this point to estimate the above given dimension.

Following the above vacuum treatment just-described, the remaining rings were given an additional copper coating in the manner described in the above referred to co-pending application and upon provision of an additional .005 of an inch coating, sectional cuts of the completed parts indicated an unoccupied internal volume within the sheath of slightly over 20 percent. The remaining rings of the series plated as above described were then subjected to temperature tests up to 475° F. for a period of two hours and no bursting was found to occur.

From the above, it would be apparent that there has been an actual expansion and contraction of the resilient core, with the plating of the core, in its expanded condition, serving to create an internal void upon subsequent contraction of the core.

With regard to the use of chlorinated solvents, it is not intended that the invention be so limited, in view of the fact that the overall novel effects obtained by practice of the invention as disclosed above, can be achieved by the use of other volatile materials to cause the expansion and subsequent contraction.

In this regard, chlorinated solvents have a particular utility, in view of the little danger presented by the same as a fire hazard. Ethylenedichloride, in particular, has been found particularly satisfactory because of the minimal decomposing effect that the same has on the neoprene. It is to be understood, however, that gasoline, oil, kerosene, and many other materials that would cause rubber to swell on a temporary or removable basis, could be employed.

Additional tests made under the same test conditions but including the additional step of making the rings after the vacuum treatment, illustrated that the rings would contract to substantially to their original size, with this being slightly more contraction than was found to occur in the case where the additional step of baking was eliminated.

It will be seen from the preceding, that there has been provided a new and novel method of electro-forming a resilient O-ring with a surrounding metallic sheath. It has been shown the improved method is extremely low in cost because the same requires only the use of relatively inexpensive volatile materials, with all such machining and or handling being eliminated as a result preliminary plating that is effectuated upon the core member while the same is in its expanded state.

It has still further been shown how this plating of the core in its expanded condition permits the creation of an internal void upon cooling of the same with the result that the component ring, during usage thereof, will be able to compensate for the unequal expansion rates of the resilient and metallic component thereof. While a full and complete disclosure of the invention has been made in accordance with the dictates of the patent statutes, it is not intended that the application be so limited. Thus, while one particular class and type of volatile has been set forth, it is to be understood that other volatiles could be employed where practical, with such substitution of compounds being within the scope of the invention. Similarly, while neoprene rubber has been illustrated as the core member, other resilient or non-resilient materials could be employed if desired.

Accordingly, modifications of the invention may be resorted to without departing from the spirit hereof or the scope of the appended claims.

This application is a continuation-in-part of co-pending application Serial No. 564,484, filed February 9, 1956, by Clarence W. Forestek, and is also a continuation-in-part of co-pending application Serial No. 608,044, filed September 5, 1956, by Clarence W. Forestek.

What is claimed is:

1. A method of making a heat resistant O-ring from an annular resilient core that has the property of expanding when treated with a volatile substance, comprising the steps of; expanding the resilient core by treating the same with a volatile substance; electrodepositing a metallic coating that is porous to said volatile substance onto said core member while the same is in said expanded condition; effectuating evaporation of said volatile substance through said porous coating, whereby said core is shrunk to normal size.

2. The method of claim 1 further characterized by the additional step of electrodepositing a second metallic coating over the porous metallic coating, following shrinking of said core to normal size.

3. The method of claim 1 further characterized by the fact that said core is expanded by boiling in a chlorinated solvent.

4. The method of claim 1 further characterized by the fact that said core is expanded by boiling the same in ethylenedichloride.

5. The method of claim 1 further characterized by the fact that said evaporation is effectuated by vacuum treatment of said core.

6. The method of claim 1 further characterized by the fact that the porous coating applied is a metallic deposit of copper between .002 and .005 in thickness.

References Cited in the file of this patent

UNITED STATES PATENTS

| 859,813 | Hartmann | July 9, 1907 |
| 889,807 | Reynolds | June 2, 1908 |
| 2,164,764 | Claypoole | July 4, 1939 |

FOREIGN PATENTS

| 8,108 | Great Britain | Mar. 11, 1893 |